Dec. 30, 1958 H. B. COLLINS 2,866,308
CARTRIDGE OF CALKING MATERIAL AND APPARATUS
FOR PRODUCING THE SAME
Filed Nov. 23, 1956 4 Sheets-Sheet 2
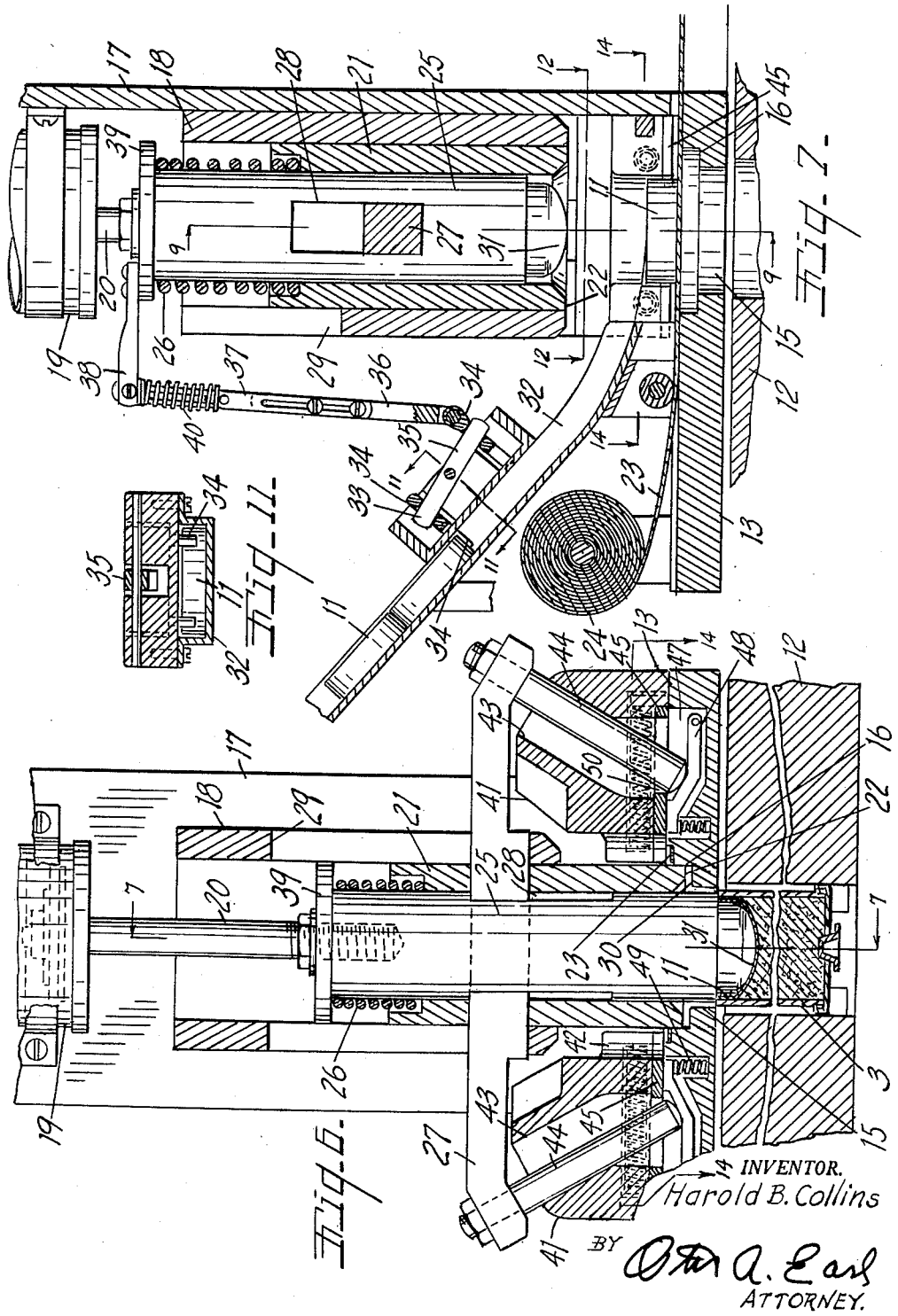
INVENTOR.
Harold B. Collins
BY
Otto A. Earl
ATTORNEY.

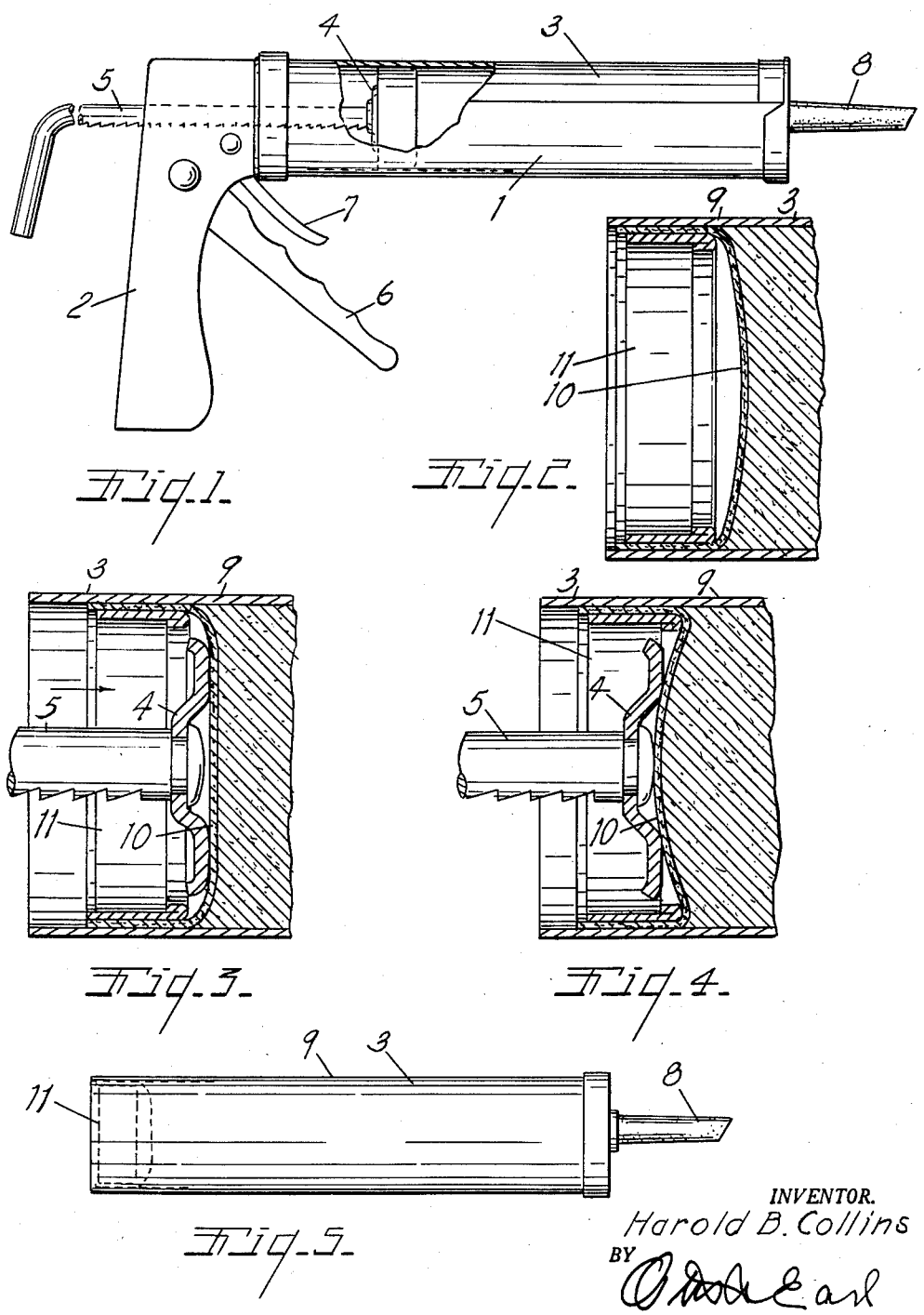

Dec. 30, 1958
H. B. COLLINS
2,866,308
CARTRIDGE OF CALKING MATERIAL AND APPARATUS
FOR PRODUCING THE SAME
Filed Nov. 23, 1956
4 Sheets-Sheet 3
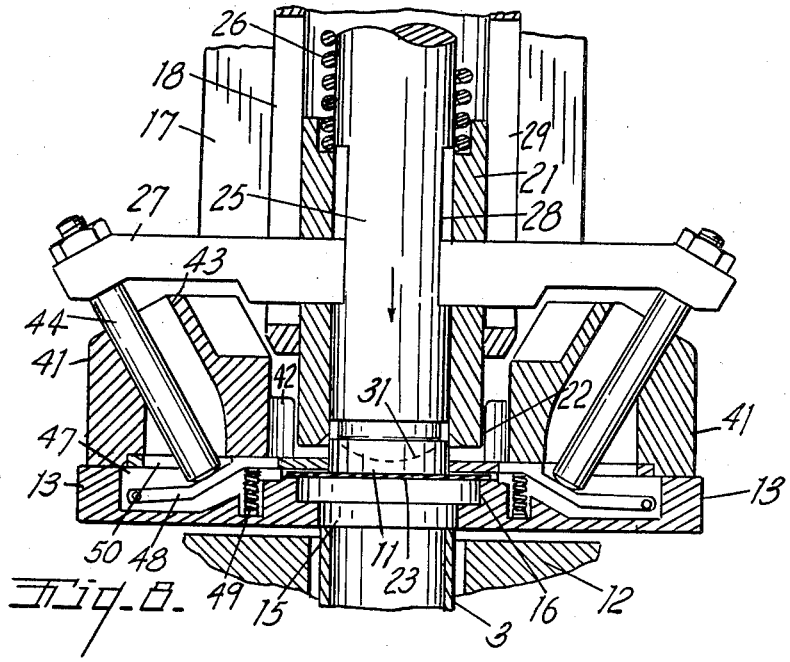
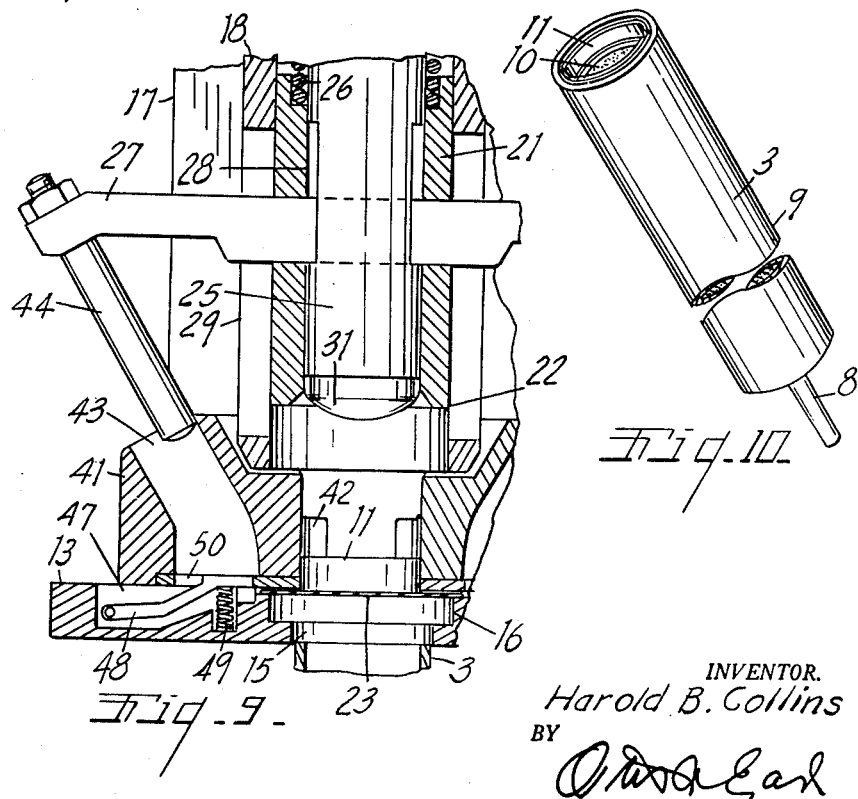
INVENTOR.
Harold B. Collins
BY
ATTORNEY.

Dec. 30, 1958    H. B. COLLINS    2,866,308
CARTRIDGE OF CALKING MATERIAL AND APPARATUS
FOR PRODUCING THE SAME
Filed Nov. 23, 1956    4 Sheets-Sheet 4
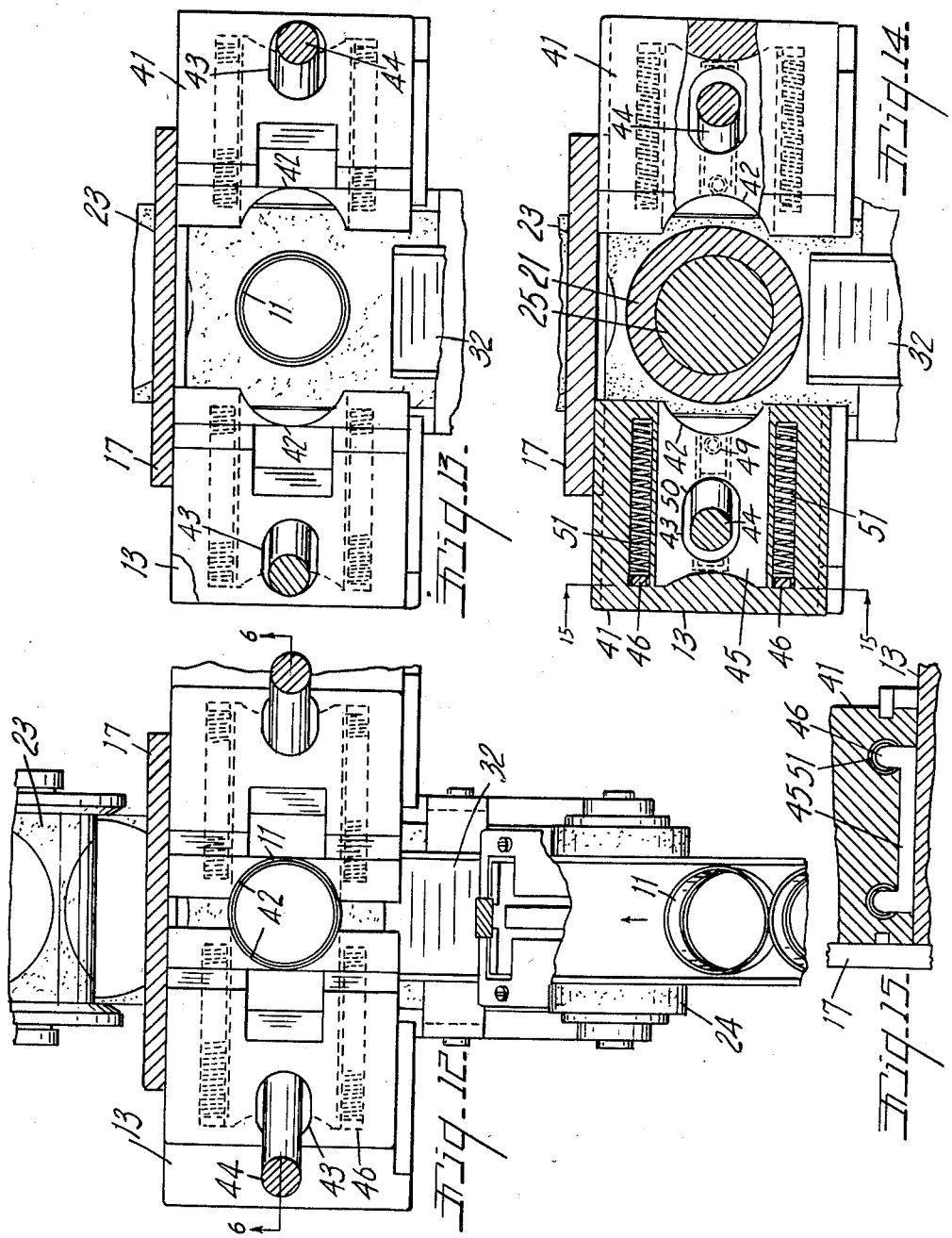
INVENTOR.
Harold B Collins
BY

United States Patent Office 2,866,308
Patented Dec. 30, 1958

2,866,308

CARTRIDGE OF CALKING MATERIAL AND APPARATUS FOR PRODUCING THE SAME

Harold B. Collins, Breedsville, Mich.

Application November 23, 1956, Serial No. 624,076

12 Claims. (Cl. 53—297)

The principal objects of this invention are:

First, to provide a novel form of cartridge for semi-fluid plastic calking material having a flexible impervious diaphragm across its rear end which will protect the calking material from contact with the air and will at the same time permit the application of extruding pressure to the material by the plunger of a calking gun and retract to relieve the pressure created in the material by the plunger when the plunger is retracted.

Second, to provide a cartridge of calking material with a flexible closure plug that will follow the material in the cartridge as the material is extruded and emptied from the cartridge.

Third, to provide a novel form of closure for cartridges of calking material which will protect the contents of the cartridge at all times while the cartridges are stored or are being used.

Fourth, to provide apparatus for quickly and inexpensively forming and inserting a flexible closure plug in the rear end of a tubular cartridge of calking material.

Fifth, to provide closure applying mechanism for tubular cartridges of calking material which will form successive closures from a continuous flexible strip of flat plastic material and insert the closure in the end of a tubular cartridge with a cylindrical backing ring behind the closure clamping the periphery of the closure in the inner surface of the cartridge.

Sixth, to provide a novel form of cutting and pressing structure, first cutting circular diaphragms from a continuous strip of flexible plastic material and then forcing the diaphragms into the ends of tubular cartridges with an annular retaining ring on the rear side of the diaphragm.

Seventh, to provide apparatus which will rapidly and inexpensively apply closure plugs having the before mentioned characteristics to the ends of filled cartridges of calking material.

Other objects and advantages of the invention will be apparent from a consideration of the following description and claims. The drawings, of which there are four sheets, illustrate a highly practical form of the cartridge of calking material and a highly practical apparatus for applying the novel closure to the cartridge.

Fig. 1 is a side elevational view of a calking gun having a plunger adapted to be releasably advanced against the semi-fluid plastic calking material in a cartridge mounted on the gun. A portion of the cartridge wall and gun are broken away in cross section.

Fig. 2 is a fragmentary enlarged axial cross sectional view through the rear end of the cartridge with the end closure of the invention in place therein.

Fig. 3 is an enlarged fragmentary axial cross sectional view through the cartridge showing the gun plunger in partially advanced material feeding position.

Fig. 4 illustrates the positions taken by the parts of the cartridge and the calking gun after feeding pressure has been released from the material in the cartridge.

Fig. 5 is a side elevational view of the assembled and closed cartridge.

Fig. 6 is a fragmentary transverse vertical cross sectional view through closure applying mechanism arranged to form and insert the end closures shown in Figs. 1 to 5 into filled tubular calking gun cartridges. The view is taken along the plane of the line 6—6 in Fig. 12.

Fig. 7 is a fragmentary longitudinal cross sectional view through the closure applying mechanism taken along the plane of the line 7—7 in Fig. 6.

Fig. 8 is an enlarged fragmentary cross sectional view similar to Fig. 6 but illustrating the parts in partially actuated position.

Fig. 9 is an enlarged fragmentary transverse cross sectional view similar to Figs. 6 and 8 but illustrating the closure forming elements in place in the apparatus as shown in Fig. 7. The view is taken along the plane of the line 9—9 in Fig. 7.

Fig. 10 is a fragmentary perspective view of the completed and closed cartridge.

Fig. 11 is a fragmentary cross sectional view taken along the plane of the line 11—11 in Fig. 7.

Fig. 12 is an enlarged fragmentary horizontal cross sectional view taken along the plane of the line 12—12 in Fig. 7.

Fig. 13 is a fragmentary view similar to Fig. 12 but showing the parts at the end of a closure applying operation.

Fig. 14 is a fragmentary enlarged horizontal cross sectional view taken along the plane of the line 14—14 in Fig. 7.

Fig. 15 is a fragmentary vertical cross sectional view taken along the plane of the line 15—15 in Fig. 14.

Cartridges holding a quantity of semi-liquid calking material and other materials of a plastic consistency are well known as as calking guns for holding the cartridge and applying pressure to the plastic material therein to feed the material through a delivery nozzle. Fig. 1 illustrates a calking gun and cartridge having the foregoing general properties and function. The gun which may be manufactured according to the disclosure in my copending application, Serial No. 501,856, filed April 18, 1955, now Patent No. 2,784,603, includes an upwardly opening semi-cylindrical chamber 1 and a handle grip 2 for supporting the cartridge 3. The gun includes a plunger or piston 4 that is pressed into the tubular cartridge by a piston rod 5 upon actuation of a grip lever 6. The pressure of the plunger may be released at any time by actuating the release lever 7 and for reasons which will be described in greater detail presently the pressure existing in the calking material causes the plunger and rod to retract slightly to relieve the pressure on the calking material so that the material does not continue to run or dribble from a delivery spout 8.

As is more clearly illustrated in Figs. 3 and 4 the cartridge 3 consists of a hollow tubular body 9 having the nozzle 8 on one end and having a closure disc 10 of light flexible plastic material seated in its rear end. The closure 10 has its periphery clamped between the inner surface of the tubular body 9 by a cylindrical ring 11 pressed into the body of the cartridge. The material of the closure disc 10 is loose and flexible in its center portion so that when the plunger 4 of the calking gun is pressed thereagainst as in Fig. 3 the diaphragm 10 is pressed inwardly of the cartridge as shown in Fig. 3. When the pressure on the plunger 4 is released the pressure built up within the cartridge will force the flexible diaphragm 10 outwardly and relieve the pressure that would ordinarily force calking material to flow from the nozzle 8. As the calking material is expended and forced inwardly into the body 3 the diaphragm or closure 10 is correspondingly forced into the tubular case 3 to remain in contact with the material. The backing ring 11 clamps the periphery of the diaphragm to the body and prevents collapsing of the diaphragm. At the same time the ring 11 being seated entirely against the surface of the periphery of the diaphragm is carried inwardly of the tube and there is no tendency for the ring and the diaphragm to become disengaged. Any outward pressure or force tending to force the closure out of the tube is resisted by the combined action of the backing ring and the periphery of the diaphragm held in tight sealing engagement within the tube 3.

The apparatus for forming and inserting the closure consisting of the diaphragm 10 and backing ring 11 is shown in Figs. 6 to 15. In these figures it is assumed that the tubular cartridge bodies 3 will have been filled with the calking material by other mechanism not illustrated and advanced in a continuous succession to a base 12 arranged to support each successive cartridge in an upright position as illustrated in Fig. 6. Positioned above the base 12 and over the supported cartridge is a flat plate 13 having an opening 15 formed therein and registering with the supported cartridge. The opening 15 is upwardly shouldered or enlarged as at 16. Projecting upwardly above the plate and to one side of the side of the opening 15 is an upright support 17 which supports a tubular slideway 18 in vertically spaced relation over the opening 15. The upright 17 also supports a fluid actuated cylinder 19 coaxially above the slideway and the piston rod 20 of the cylinder projects downwardly into the slideway.

Slidably mounted within the slideway 18 is a tubular cutter 21 having a circular cutting edge 22 around its lower end that is arranged to enter into and coact with the upper enlarged edge of the opening 15 in the plate 13. A continuous strip of flexible flat closure forming material 23 is fed from a suitable supply roll 24 as in Fig. 7 and delivered across the opening 15 and through a slot in the upright 17 to feed mechanism not illustrated. As the tubular cutter 21 descends it cuts out a circular diaphragm 10 from the strip 23 and forces the disc shaped diaphragm part way into the shouldered portion of the opening 15.

The tubular cutter 21 is actuated indirectly from the cylinder 19. Slidably mounted within the tubular cutter is a plunger 25 that is directly connected at its upper end to the piston rod 20. A coil spring 26 is compressed between a collar on the plunger and the upper end of the tubular cutter so that as the piston rod and plunger descend the tubular cutter is advanced by yieldable pressure to sever the closure discs. The tubular cutter 21 carries a transversely extending cross bar 27 that extends diametrically through a vertically elongated slot 28 in the plunger and through vertically elongated slots 29 in the sides of the slideway 18. As the plunger descends the cross bar 27 strikes the lower end of the slots 29 to limit downward motion of the cutter with its lower end in spaced relationship to the shoulder 16 as at 30 in Fig. 6. The plunger 25 is free to descend further and is provided with a rounded lower end 31 of reduced diameter that is sized to project through one of the backing rings 11 that is positioned over the diaphragm 10.

The backing rings 11 are delivered successively to each succeeding cartridge by means of a delivery chute 32 having a gate mechanism 33 on its upper side. The gate mechanism consists of spaced stops 34 connected to the opposite ends of a lever 35 and positioned over the chute 32. One of the stops 34 is pivotally connected to a slide link 36 having a lost motion driving connection to a second link 37 that is connected at its upper end to the bracket 38. The bracket 38 is connected to the collar 39 on the plunger and a spring 40 positioned around the link 37 functions to depress the lower stop 34 as the plunger descends to simultaneously raise the upper stop 34 and admit a single back ring 11 to a holding pocket spaced from the axis of the plunger 25. Upward motion of the plunger after completing a capping operation raises the lower stop 34 as will be understood and releases the single ring from the holding pocket so that it may fall by gravity over the succeeding cartridge and the superimposed strip of diaphragm material.

In order to hold the backing rings 11 in correctly centered relation to the plunger 25 and over the surface of the strip of diaphragm material 23 the plate 16 carries two laterally shiftable jaw members 41 having opposed concave jaw surfaces 42 positioned on opposite sides of the opening 15 in the plate. The jaw members 41 define downwardly and inwardly converging slots 43 within which inclined pins 44 carried on the ends of the cross bar 27 are slidable. It will be apparent that upward movement of the tubular cutter 21 carrying with it the cross bar 27 will cause the pins 44 to cammingly engage the upper inside edges of the slots 43 and force the jaw members inwardly over the opening 15 where they form a socket adapted to receive and locate the succeeding backing rings 11. Slidably mounted on the undersides of the jaw members 41 are opposed jaw plates 45 having upstanding ears 46 on their outer ends. (See Figs. 14 and 15.) The jaw plates 45 thus tend to move with the jaw members 41 to grip and hold the backing rings 11.

In order to hold the backing rings 11 in properly centered position as long as possible the plate 13 is recessed under the jaw members 41 as at 47 to pivotally support a pair of trigger levers 48 below the jaw plates. The trigger levers 48 are biased upwardly by springs 49 and the jaw plates are apertured as at 50 so that when upward motion of the plunger and the inclined pins 44 cams the jaw inwardly the trigger levers snap upwardly into the apertures 50 and hold the jaw plates in closed gripping engagement with the backing ring regardless of motion of the jaw members and until released at the right time.

The succeeding downward motion of the inclined pins 44 first engages the lower outside edges of the slots 43 and cams the jaw members 41 outwardly. However the jaw plates are locked in closed position as just noted so that outward motion of the jaw members compresses spring 41 against the ears 46 on the jaw plates. During this period the plunger 25 continues its downward motion to press its rounded end 31 through the backing ring. Continued downward motion of the cutter 21 and the inclined pins 44 causes the pins to engage the trigger levers 48 and depress them out of engagement in the openings 50 so that the jaw plates snap outwardly under the pressure of the springs 51. The cutter then completes its shearing operation through the space vacated by the jaw plates and comes to rest. The plunger 25 continues to move downward and press the backing ring and the newly severed diaphragm into the cartridge.

Having thus described the invention, what is claimed as new and is desired to be secured by Letters Patent is:

1. A machine for capping cartridges of plastic calking material comprising a base adapted to support an open topped tubular cartridge in upright position, a plate positioned over said base and defining an upwardly shouldered opening over the position of an empty cartridge in said base, the upper edge of said opening constituting a shearing edge, an upright projecting above said plate to one side of said opening, a vertical guide on said upright positioned in spaced relation over said opening, a tubular cutter slidable in said guide and extensible into the upper end of said opening in shearing relation to said shearing edge, a cross bar extending through said cutter and registering slots in said guide to limit downward motion of said cutter in spaced relation above the shoulder in said opening, a plunger slidably guided in said cutter and sized to project into said cartridge in said base, a rounded end of reduced diameter on said plunger projectable into the end of said cartridge, a slot in said plunger passing said cross bar and forming a lost motion positive driving connection between said plunger and said cutter, a fluid actuated piston means connected to said plunger to reciprocate the same, a spring compressed between said plunger and said cutter and forming a yieldable downward driving connection therebetween, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cylindrical ring having a rounded lower edge and sized to fit into said cartridge and around the end of said plunger into said socket, oppositely inwardly and downwardly inclined cam slots formed in said slides, downwardly and inwardly inclined rod members on said cross bar received in said slots, said slots being longer than the thickness of said bars to form a lost motion connection between the rods and slides, lock plates slidable between said slides and said plate and having opposed jaws, springs acting between said slides and the underlapped lock plates to bias the plates in the same direction of movement as the slides, triggers recessed into said plate below said lock plates and having holding edges spring biased upwardly into retaining engagement with said lock plates in the inward gripping position of the lock plates relative to a ring in said socket, said lock plates having openings therein through which the lower ends of said rods project to engage and release said triggers just prior to the end of the downward motion of said cutter and said cross bar.

2. A machine for capping cartridges of plastic material comprising a plate defining an upwardly shouldered opening over the position of an empty cartridge, the upper edge of said opening constituting a shearing edge, a vertical guide positioned in spaced relation over said opening, a tubular cutter slidable in said guide and extensible into the upper end of said opening in shearing relation to said shearing edge, a cross bar extending through said cutter and registering slots in said guide to limit downward motion of said cutter in spaced relation above the shoulder in said opening, a plunger slidably guided in said cutter and sized to project into said cartridge, a rounded end of reduced diameter on said plunger projectable into the end of said cartridge, a slot in said plunger passing said cross bar and forming a lost motion positive driving connection between said plunger and said cutter, a fluid actuated piston means connected to said plunger to reciprocate the same, a spring compressed between said plunger and said cutter and forming a yieldable downward driving connection therebetween, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cylindrical ring having a rounded lower edge and sized to fit into said cartridge and around the end of said plunger into said socket, oppositely inwardly and downwardly inclined cam slots formed in said slides, downwardly and inwardly inclined rod members on said cross bar received in said slots, said slots being longer than the thickness of said bars to form a lost motion connection between the rods and slides, lock plates slidable between said slides and said plate and having opposed jaws, springs acting between said slides and the underlapped lock plates to bias the plates in the same direction of movement as the slides, triggers recessed into said plate below said lock plates and having holding edges spring biased upwardly into retaining engagement with said lock plates in the inward gripping position of the lock plates relative to a ring in said socket, said lock plates having openings therein through which the lower ends of said rods project to engage and release said triggers just prior to the end of the downward motion of said cutter and said cross bar.

3. A machine for capping cartridges of plastic calking material comprising a base adapted to support an open topped tubular cartridge in upright position, a plate positioned over said base and defining an upwardly shouldered opening over the position of said cartridge in said base, the upper edge of said opening constituting a shearing edge, an upright projecting above said plate to one side of said opening, a vertical guide on said upright positioned in spaced relation over said opening, a tubular cutter slidable in said guide and extensible into the upper end of said opening in shearing relation to said shearing edge, a cross bar extending through said cutter and registering slots in said guide, means acting to limit downward motion of said cutter in spaced relation above the shoulder in said opening, a plunger slidably guided in said cutter and sized to project into said cartridge in said base, a rounded end of reduced diameter on said plunger projectable into the end of said cartridge, a slot in said plunger passing said cross bar, means connected to said plunger to reciprocate the same, a spring compressed between said plunger and said cutter and forming a yieldable downward driving connection therebetween, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cylindrical ring sized to fit into said cartridge and around the reduced end of said plunger into said socket, oppositely inwardly and downwardly inclined cam slots formed in said slides, downwardly and inwardly inclined rod members on said cross bar received in said slots, said slots being longer than the thickness of said rods to form a lost motion connection between the rods and slides, lock plates slidable between said slides and said plate and having opposed jaws, springs acting between said slides and the underlapped lock plates to bias the lock plates outwardly relative to the slides, triggers carried by said plate and having holding edges spring biased into retaining engagement with said lock plates in the inward gripping position of the lock plates relative to a ring in said socket, and means reciprocated with said cutter to engage and release said triggers just prior to the end of the downward motion of said cutter.

4. A machine for capping cartridges of semi-fluid material comprising means to support an open topped tubular cartridge in upright position, a plate positioned over said means and defining an upwardly shouldered opening over the position of said cartridge, a shearing edge formed around said opening, a vertical guide positioned in spaced relation over said openings, a tubular cutter slidable in said guide and extensible into the upper end of said opening in shearing relation to said shearing edge, a cross bar extending through said cutter, means acting to limit downward motion of said cutter in spaced relation above the shoulder in said opening, a plunger slidably guided in said cutter and sized to project into said cartridge, a rounded end of reduced diameter on said plunger projectable into the end of said cartridge, a slot in said plunger passing said cross bar, means connected to said plunger to reciprocate the same, a spring compressed between said plunger and said cutter and forming a yieldable downward driving connection therebetween, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cylindrical ring sized to fit into said cartridge and around the end of said plunger into said socket, means forming oppositely inwardly and downwardly inclined and spaced upper and lower cam surfaces on said slides, downwardly and inwardly inclined rod members on said cross bar received between said cam surfaces, said cam surfaces being further apart than the thickness of said rods to form a lost motion connection between the rods and slides, lock plates slidable between said slides and said plate and having opposed jaws, springs acting between said slides and the under-lapped lock plates to bias the lock plates outwardly relative to the slides, triggers pivoted on said plate and having holding edges spring biased into retaining engagement with said lock plates in the inward gripping position of the lock plates relative to a ring in said socket, and means reciprocable with said cutter positioned to engage and release said triggers just prior to the end of the downward motion of said cutter.

5. A machine for capping cartridges of semi-fluid material comprising means to support an open topped tubular cartridge in upright position, a plate positioned over said means and defining an opening over the position of said cartridge, a shearing edge formed around said opening, a vertical guide positioned in spaced relation over said opening, a tubular cutter slidable in said guide and extensible into the upper end of said opening in shearing relation to said cutter, means acting to limit downward motion of said cutter, a plunger slidably guided in said cutter and sized to project into said cartridge, a rounded end of reduced diameter on said plunger projectable into the end of said cartridge, means connected to said plunger to reciprocate the same, a spring compressed between said plunger and said cutter and forming a yieldable downward driving connection therebetween, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cylindrical ring sized to fit into said cartridge and around the end of said plunger into said socket, means forming oppositely inwardly and downwardly inclined and cam surfaces on said slides, downwardly and inwardly inclined cams carried by said cutter and cooperative with said cam surfaces, said cam surfaces and said cams being relatively vertically movable to form a lost motion connection between the cutter and slides, lock plates slidable between said slides and said plate and having opposed jaws, springs acting between said slides and the underlapped lock plates to bias the lock plates outwardly relative to the slides, triggers pivoted on said plate and having holding edges spring biased into retaining engagement with said lock plates in the inward gripping position of the lock plates relative to a ring in said socket, and means reciprocable with said cutter positioned to engage and release said triggers just prior to the end of the downward motion of said cutter.

6. A machine for capping cartridges of semi-liquid material comprising a plate defining an opening, means for supporting a cartridge with its open end registering with said opening, the opposite edge of said opening constituting a shearing edge, a guide positioned in spaced relation to said opening, a tubular cutter slidable in said guide and extensible into said opening in shearing relation to said shearing edge, laterally extending arms carried by said cutter, a plunger slidably guided in said cutter and sized to project into said cartridge, an end of reduced diameter on said plunger projectable into the end of said cartridge, means connected to said plunger to reciprocate the same, a spring compressed between said plunger and said cutter and forming a yieldable driving connection therebetween, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cylindrical ring sized to fit into said cartridge and around the end of said plunger into said socket, spaced pairs of inclined cam surfaces formed in said slides in converging relation to said opening, inclined rod members on said arms received between the surfaces of said pairs of surfaces, the spacing of said surfaces being greater than the thickness of said rods to form a lost motion connection between the rods and slides, lock plates slidable between said slides and said plate and having opposed jaws, springs acting between said slides and the underlapped lock plates to bias the plates outwardly relative to the slides, triggers pivoted on said plate and having holding edges spring biased into retaining engagement with said lock plates in the inward gripping position of the lock plates relative to a ring in said socket, and means reciprocable with said cutter to engage and release said triggers just prior to the end of the inward motion of said cutter.

7. A machine for capping cartridges of semi-liquid material comprising a plate defining an opening, means for supporting a cartridge with its open end registering with said opening, the opposite edge of said opening constituting a shearing edge, a guide positioned in spaced relation to said opening, a tubular cutter slidable in said guide and extensible into said opening in shearing relation to said shearing edge, laterally extending arms carried by said cutter, a plunger slidably guided in said cutter and sized to project into said cartridge, an end of reduced diameter on said plunger projectable into the end of said cartridge, means connected to said plunger to reciprocate the same, a spring compressed between said plunger and said cutter and forming a yieldable driving connection therebetween, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cylindrical ring sized to fit into said cartridge and around the end of said plunger into said socket, spaced pairs of inclined cam surfaces formed in said slides in converging relation to said openings, and inclined rod members on said arms received between the surfaces of said pairs of surfaces, the spacing of said surfaces being greater than the thickness of said rods to form a lost motion connection between the rods and slides.

8. A machine for capping cartridges of semi-liquid material comprising a plate defining an opening, means for supporting a cartridge with its end opposed to said opening, the edge of said opening constituting a shearing edge, an annular cutter reciprocable into and out of the end of said opening in shearing relation to said shearing edge, a plunger reciprocable through said cutter and sized to fit into said cartridge, an end of reduced diameter on said plunger projectable into the end of said cartridge, means connected to said plunger to reciprocate the same, means forming an inwardly yieldable lost motion driving connection between said plunger and said cutter, means for feeding a strip of flexible material across said plate and the opening therein to have a closure diaphragm cut therefrom by said cutter and pressed into said cartridge by said plunger, laterally reciprocable slides on said plate having opposed jaws forming a circular socket over said strip and said opening in said plate, means for feeding a cyclindrical ring sized to fit into said cartridge and around the end of said plunger into said socket, inwardly converging pairs of spaced inclined cam surfaces formed on said slides, and downwardly and inwardly inclined cams carried by said cutter and received between the cam surfaces of said pairs of surfaces, said cams being thinner than the thickness of the space between said pairs of surfaces to form a lost motion connection between the cutter and slides.

9. A machine for pressing a flexible closure diaphragm into a tubular cartridge with a cylindrical backing ring clamping the periphery of the diaphragm to the cartridge wall comprising a plate having a hole therein larger than the diameter of the cartridge with an annular cutting edge therearound, a plunger of the same diameter as the inside of said cartridge positioned to be reciprocated through said hole into said cartridge and having a reduced end of a diameter to project into said ring, means for feeding a strip of thin flexible diaphragm forming material and wider than said hole across said hole, means for delivering said ring onto said strip over said hole, laterally reciprocable jaws movable over said strip to hold said ring in position over said hole, an annular cutter reciprocable longitudinally of said plunger and against said cutting edge to sever a diaphragm from said strip and around said ring, means for reciprocating said plunger, and means driven in timed relation with said plunger and from said plunger for advancing said cutter with said plunger for the first part of the advancing stroke of the plunger to sever said web and to retract said jaws to clear them from the path of the advancing cutter.

10. A machine for pressing a flexible closure diaphragm into a tubular cartridge with a cylindrical backing ring clamping the periphery of the diaphragm to the cartridge wall comprising a plate having a hole therein larger than the diameter of the cartridge with an annular cutting edge therearound, a plunger of the same diameter as the inside of said cartridge positioned to be reciprocated through said hole into said cartridge and having a reduced end of a diameter to project into said ring, means for feeding a strip of thin flexible diaphragm forming material and wider than said hole across said hole, means for delivering said ring onto said strip over said hole, laterally reciprocable jaws movable over said strip to hold said ring in position over said hole, an annular cutter reciprocable longitudinally of said plunger and against said cutting edge to sever a diaphragm from said strip and around said ring, means for reciprocating said plunger, and means driven in timed relation with said plunger for advancing said cutter with said plunger for the first part of the advancing stroke of the plunger to sever said web and to retract said jaws to clear them from the path of the advancing cutter.

11. A machine for pressing a flexible closure diaphragm into a tubular cartridge with a cylindrical backing ring clamping the periphery of the diaphragm to the cartridge wall comprising a plate having a hole therein larger than the diameter of the cartridge with an annular cutting edge therearound, a plunger of the same diameter as the inside of said cartridge positioned to be reciprocated through said hole into said cartridge and having a reduced end of a diameter to project into said ring, means for feeding a strip of thin flexible diaphragm forming material and wider than said hole across said hole, means for delivering said ring onto said strip over said hole, an annular cutter reciprocable longitudinally of said plunger and against said cutting edge to sever a diaphragm from said strip and around said ring, means for reciprocating said plunger, and means driven in timed relation with said plunger for advancing said cutter with said plunger for the first part of the advancing stroke of the plunger to sever said web.

12. A machine for pressing a flexible closure diaphragm into a tubular cartridge with a cylindrical backing ring clamping the periphery of the diaphragm to the cartridge wall comprising a plate having a hole therein larger than the diameter of the cartridge with an annular cutting edge therearound, a plunger of the same diameter as the inside of said cartridge positioned to be reciprocated through said hole into said cartridge and having a reduced end of a diameter to project into said ring, means for feeding a strip of thin flexible diaphragm forming material and wider than said hole across said hole, means for delivering said ring into alignment with said plunger, an annular cutter reciprocable longitudinally of said plunger and against said cutting edge to sever a diaphragm from said strip and around said ring, means for reciprocating said plunger, and means driven in timed relation with said plunger for advancing said cutter with said plunger for the first part of the advancing stroke of the plunger to sever said web.

References Cited in the file of this patent

UNITED STATES PATENTS

| | | |
|---|---|---|
| 2,168,109 | West | Aug. 1, 1939 |
| 2,493,891 | McCarty | Jan. 10, 1950 |
| 2,506,204 | Freestone | May 2, 1950 |
| 2,664,232 | Midgley | Dec. 29, 1953 |